US011885176B2

(12) United States Patent
Roe

(10) Patent No.: US 11,885,176 B2
(45) **Date of Patent: *Jan. 30, 2024**

(54) SAFETY GATE CLOSURE PREVENTER

(71) Applicant: Philippe Roe, East Patchogue, NY (US)

(72) Inventor: Philippe Roe, East Patchogue, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/893,507

(22) Filed: Aug. 23, 2022

(65) Prior Publication Data

US 2022/0396994 A1 Dec. 15, 2022

Related U.S. Application Data

(63) Continuation of application No. 16/796,909, filed on Feb. 20, 2020, now Pat. No. 11,421,471.

(60) Provisional application No. 62/808,291, filed on Feb. 20, 2019.

(51) Int. Cl.

*E06B 9/04* (2006.01)
*E06B 11/02* (2006.01)
*E06B 9/00* (2006.01)
*E06B 11/08* (2006.01)

(52) U.S. Cl.

CPC .................. *E06B 9/00* (2013.01); *E06B 9/04* (2013.01); *E06B 11/022* (2013.01); *E06B 11/085* (2013.01); *E06B 2009/002* (2013.01)

(58) Field of Classification Search

CPC . E06B 9/00; E06B 9/04; E06B 11/022; E06B 11/085; E06B 2009/002; E06B 9/01; E06B 9/02; E06B 2009/015; Y10T 16/61; E05Y 2900/132

See application file for complete search history.

(56) References Cited

U.S. PATENT DOCUMENTS 1,686,819 A * 10/1928 Kirschbaum ............. E06B 5/00 49/56
2,129,923 A * 9/1938 Frankel ................... F25D 11/02 16/86 A
3,894,356 A * 7/1975 Imhoff ...................... E05F 5/12 49/366
3,919,807 A * 11/1975 Mefford .................... E06B 9/02 292/259 R
4,103,458 A * 8/1978 Booker ..................... E06B 5/11 49/56
4,356,668 A * 11/1982 Wagner ................. E01F 13/048 49/31
4,493,164 A * 1/1985 Wagner ................. E05F 15/686 49/31

(Continued)

*Primary Examiner* — Justin B Rephann
(74) *Attorney, Agent, or Firm* — Daniel P. Burke & Associates, PLLC; Daniel P. Burke

(57) ABSTRACT

The safety systems enhance the safety of confined spaces which can present a danger to human occupants who may become entrapped within the confined space during a dangerous condition. The safety systems are particularly useful with confined spaces having access openings and a door or other movable barrier for the access opening. The safety systems having movable safety gates proximate the access openings. The disclosed safety gates are movable from a closed position where the safety gate forms a physical barrier which inhibits human entry into the confined space to a safety position where the safety gate prevents the door from closing and entrapping a person within the confined space.

15 Claims, 15 Drawing Sheets

(56) References Cited

U.S. PATENT DOCUMENTS

| | | | | |
|---|---|---|---|---|
| 4,891,906 | A * | 1/1990 | Knapp | E05C 7/02 49/65 |
| 4,932,160 | A * | 6/1990 | Sperko | E05F 15/614 49/277 |
| 4,982,474 | A * | 1/1991 | Kjellstrom | E05C 17/04 16/83 |
| 5,927,011 | A * | 7/1999 | Sickenius | E06B 9/02 49/70 |
| 6,357,509 | B1 * | 3/2002 | Lamazares | E05C 17/00 49/67 |
| 6,510,587 | B2 * | 1/2003 | Urschel | E05F 5/02 16/83 |
| 7,165,595 | B2 * | 1/2007 | Yamamoto | E06B 5/11 49/70 |
| 7,937,806 | B1 * | 5/2011 | Doyle | E05F 5/04 16/83 |
| 8,276,240 | B2 * | 10/2012 | Ritachka | E05F 5/06 16/83 |
| 9,228,386 | B2 * | 1/2016 | Thielmann | E06B 3/4663 |
| 10,808,438 | B2 * | 10/2020 | Takase | E06B 1/70 |
| 11,098,522 | B1 * | 8/2021 | Fugate | E06B 5/10 |
| 11,371,272 | B2 * | 6/2022 | Pesacov | E05C 17/047 |
| 2002/0166203 | A1 * | 11/2002 | Urschel | E05F 5/02 16/82 |
| 2005/0000175 | A1 * | 1/2005 | Machledt | H02G 9/10 52/220.1 |
| 2005/0028946 | A1 * | 2/2005 | Weishar | E05F 15/643 160/214 |
| 2007/0113478 | A1 * | 5/2007 | Chu | E05C 7/02 49/67 |
| 2015/0091313 | A1 * | 4/2015 | Braselton | E05C 17/50 292/342 |

* cited by examiner

SAFETY GATE CLOSURE PREVENTER

RELATED APPLICATION DATA

This application is a continuation of U.S. patent application Ser. No. 16/796,909, filed on Feb. 20, 2020, now U.S. Pat. No. 11,421,471, issued on Aug. 23, 2022, which claims the benefit of U.S. Provisional Patent Application Ser. No. 62/808,291, filed on Feb. 20, 2019, which are hereby incorporated by reference.

A safety gate for confined spaces having doors or other movable access barriers. The safety gates provide a physical barrier which inhibits entry into the confined space when the safety gate is in a closed position and prevents the door or access barrier from closing and entrapping a person when the safety gate is in a safety position.

BACKGROUND

The closure of doors, hatch covers or shields through inadvertence, gravity, by a spring biased door swinging closed, or by mechanical failures of actuated door controls, which provide access to confined spaces such as small and bulk autoclaves, rack and cage wash equipment, high pressure chambers, vacuum chambers, bulk sterilizers, vaults, freezers, machines, pens, garages, cold storage rooms, and similar types of equipment and other potentially hazardous confined spaces, has resulted in serious injuries and fatalities. For example, in a 2012 accident a technician was entrapped in the confined space of the bulk sterilizer when another worker closed the chamber door and started the normal operation cycle of the sterilizer under the mistaken belief that all persons had egressed the confined space. The technician did not survive. In another fatal accident in 2005, a worker was locked in a commercial size, high-temperature, rack wash machine, unbeknownst to his co-workers.

Therefore, there is a need to improve the safety of confined spaces to minimize the risk of serious injury or worse to technicians and operators.

SUMMARY

Various embodiments provide movable safety gates to the access openings of confined spaces which present a danger to human occupants who may become entrapped within the confined space during a dangerous condition, such as an extreme temperature, a vacuum, high pressure steam and/or a toxic or hazardous gas or chemical. The various embodiments enhance the safety of confined spaces which have access openings and a selectively openable and closable access barrier, such as a door, hatch cover and the like which are normally maintained in a closed position during operation of the equipment, but which can be opened to allow the ingress and egress of an adult human. The disclosed safety gates are movable from a closed position where the safety gate forms a physical barrier which inhibits entry into the confined space to a safety position where the safety gate prevents the door or form of access barrier from closing and entrapping a person within the confined space.

DETAILED DESCRIPTION

Figure 1:
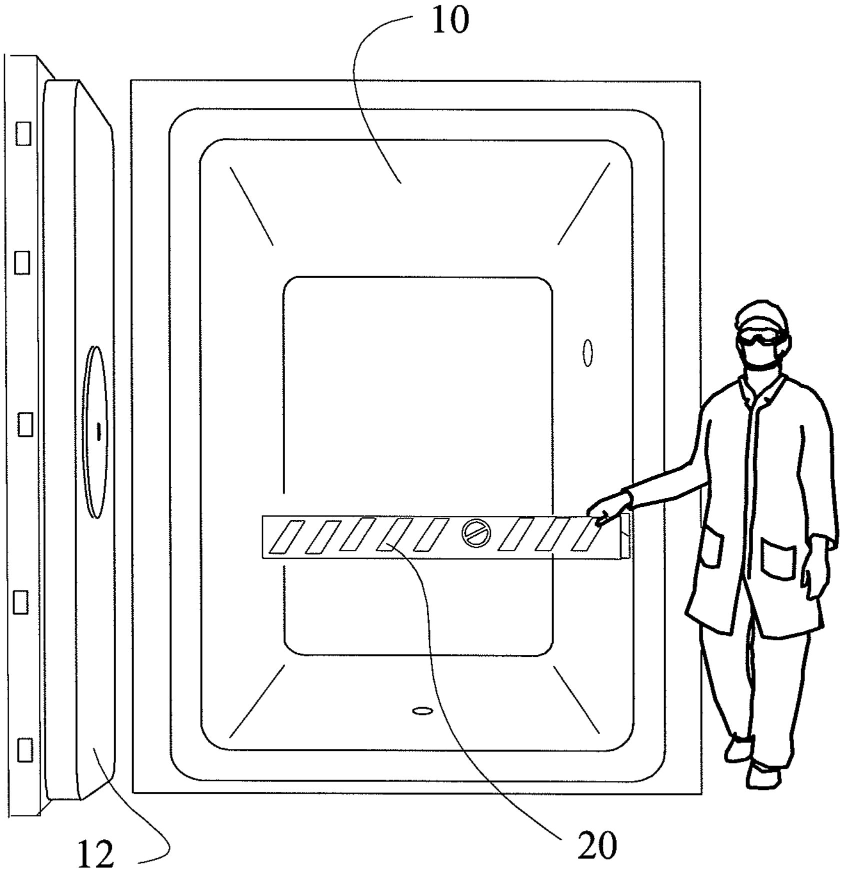
FIGS. 1 and 2 are front, perspective views of a sterilizing chamber with a safety gate in the closed position.

A safety system comprises a confined space and a safety gate which provides a protective shield or barrier that inhibits entry into the confined space that may be hazardous to a human occupant when the safety gate is in closed position. When the safety gate is swung aside to the "safety" position to permit a person to pass through an access opening, the safety gate itself blocks, stops or otherwise prevents a door, cover or shield (door) from fully shutting. When the technician or operator leaves the confined space, she can return the safety gate to the closed position and fully shut the door. Thus, the safety gate reduces the risk that a person will inadvertently become trapped within a dangerous confined space by the door, cover, shield or the like.

As used herein, the term "confined space" is used to indicate a space that:

(1) Is large enough and so configured that an employee can bodily enter and perform assigned work; and (2) Has limited or restricted means for entry or exit (for example, tanks, vessels, silos, storage bins, hoppers, vaults, and pits are spaces that may have limited means of entry); and (3) Is not designed for continuous employee occupancy." As used herein, the term "confined space" refers to the space when a normal barrier to entry, such as a door or manhole cover, are in the close position. As used herein, "confined spaces" include, but are not limited to, sterilization chambers, wash equipment, tanks, vessels, silos, storage bins, hoppers, vaults, pits, manholes, tunnels, equipment housings, ductwork, pipelines, etc. The focus of the safety systems described herein is to enhance safety in spaces which are inhospitable to human health and well-being during operating conditions. The subject confined spaces are not necessarily air tight.

One embodiment of a disclosed safety system comprises a safety gate configured so that when the safety gate is in the closed position the safety gate remains in closed position, forming a physical boundary to the confined space. In other words, until a person purposely causes the opening of the safety gate, the safety gate will remain in the closed position blocking human ingress into the confined space. When the safety gate is even partially swung away from the closed position, the safety gate is biased such that the safety gate will swing fully to the "safety position" and will remain in the safety position, preferably resting on the door jamb. In the safety position, the safety gate prevents the door (or other barrier) to the confined space from fully closing, thus preventing complete entrapment of a person within the confined space.

When the safety gate is mounted inside the confined space relative to the door, the safety gate is preferably configured to prevent the blocking arm of the safety gate from swinging into the confined space from the closed position. Alternatively, if the door is designed to be opened by pushing the door into the confined space, when the safety gate is in the safety position, the safety gate will block the door jamb and prevent the door from swinging fully outwardly to close. In either design, once the safety gate is even partially moved from the closed position, the safety gate is biased, e.g. by a spring or cam hinge (gravity), to remain in the safety position to block the door, cover or shield from inadvertently closing and entrapping a person.

The safety gate is preferably mounted inside the confined space, on or near the door jamb, behind the door of the confined space. In such embodiments, the safety gate is designed to be swung outwardly after the door is opened, in order to allow a person to pass into the confined space. However, when it is necessary to mount the safety gate on the outside of the confined space, e.g. in front of the door, then the safety gate is designed and mounted to swing from a closed position blocking access to the confined space to a safety position in the confined space when the door is opened inwardly. In the safety position, the safety gate is positioned to prevent the door from fully closing when the safety gate is in the opened position. After all persons have egressed the confined space, the safety gate is returned to the closed position and the door is permitted to be fully closed.

Figure 2:
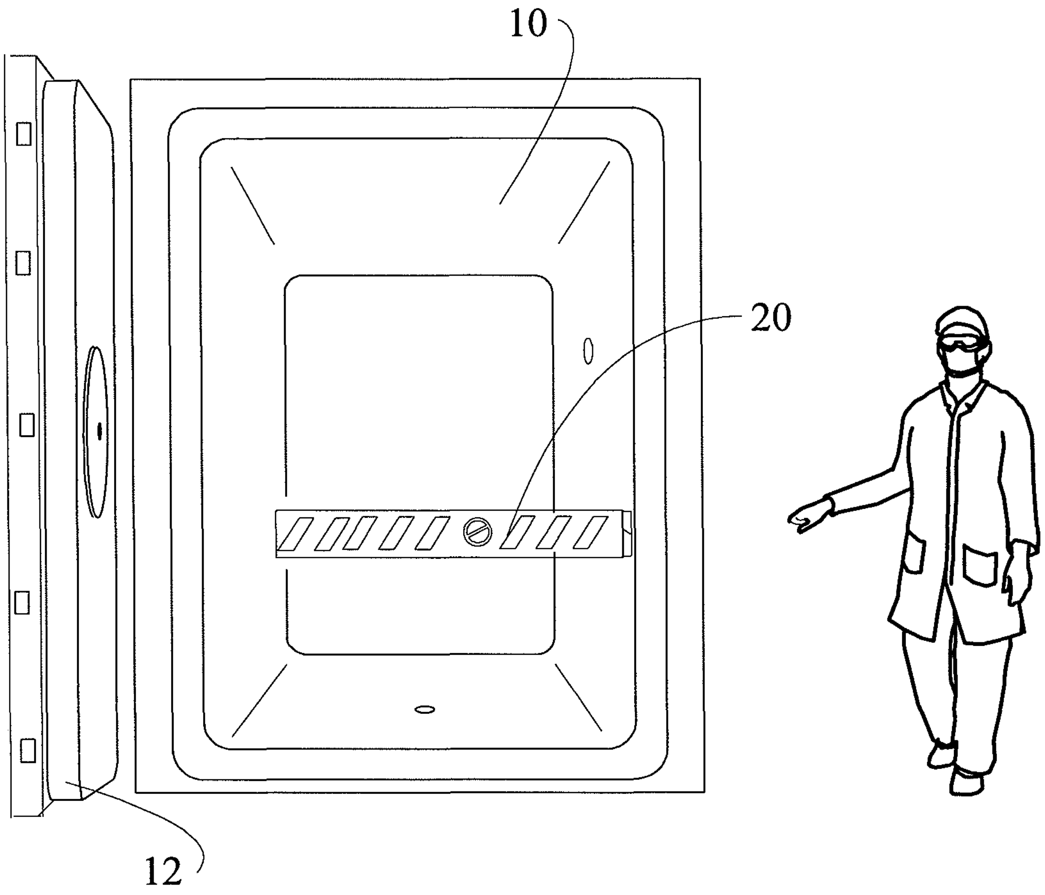

The figures illustrate examples of the safety systems including the disclosed safety gates. FIGS. 1-6 illustrate an example of a safety system having safety gate 20 mounted inside of the entrance or doorway of a sterilization chamber 10 having a door 12. FIGS. 1 and 2 show the safety gate 20 in the closed position inhibiting access to the interior of the chamber 10 and door 12 in the open position. FIG. 2 shows that safety gate 20 remains in the closed position until it is purposely moved by an operator.

Figure 3:
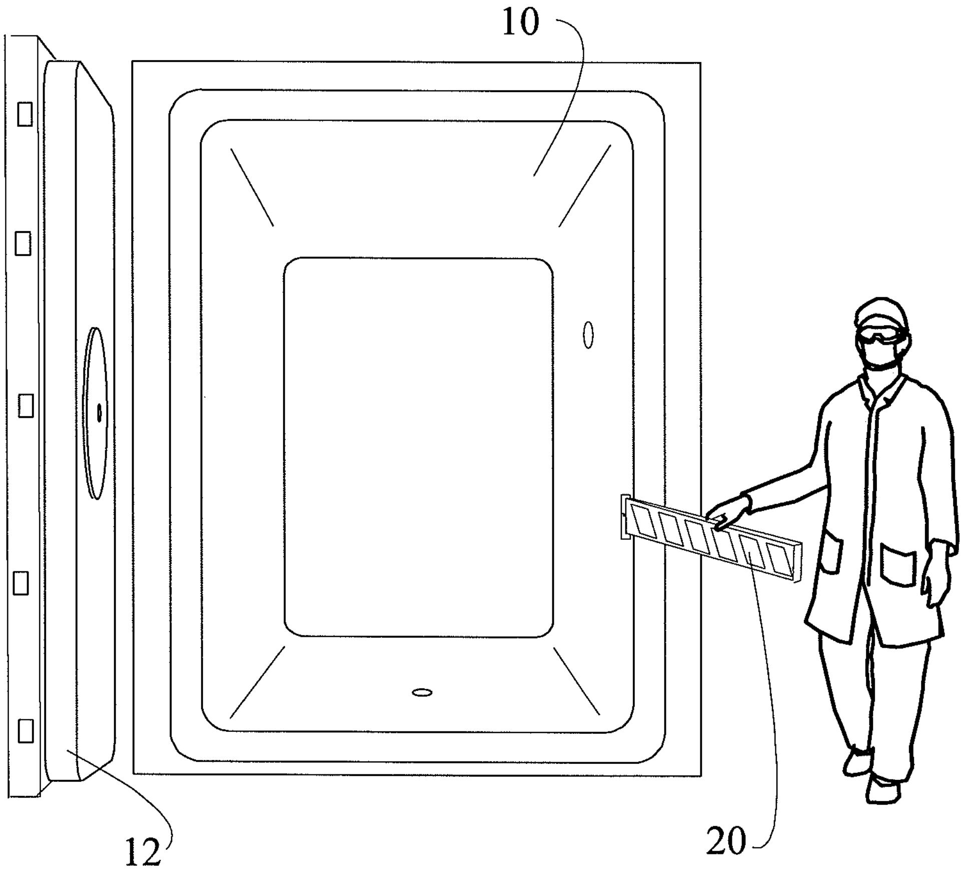
FIGS. 3 and 4 are front, perspective views of a sterilizing chamber with a safety gate in the safety position.
Figure 4:
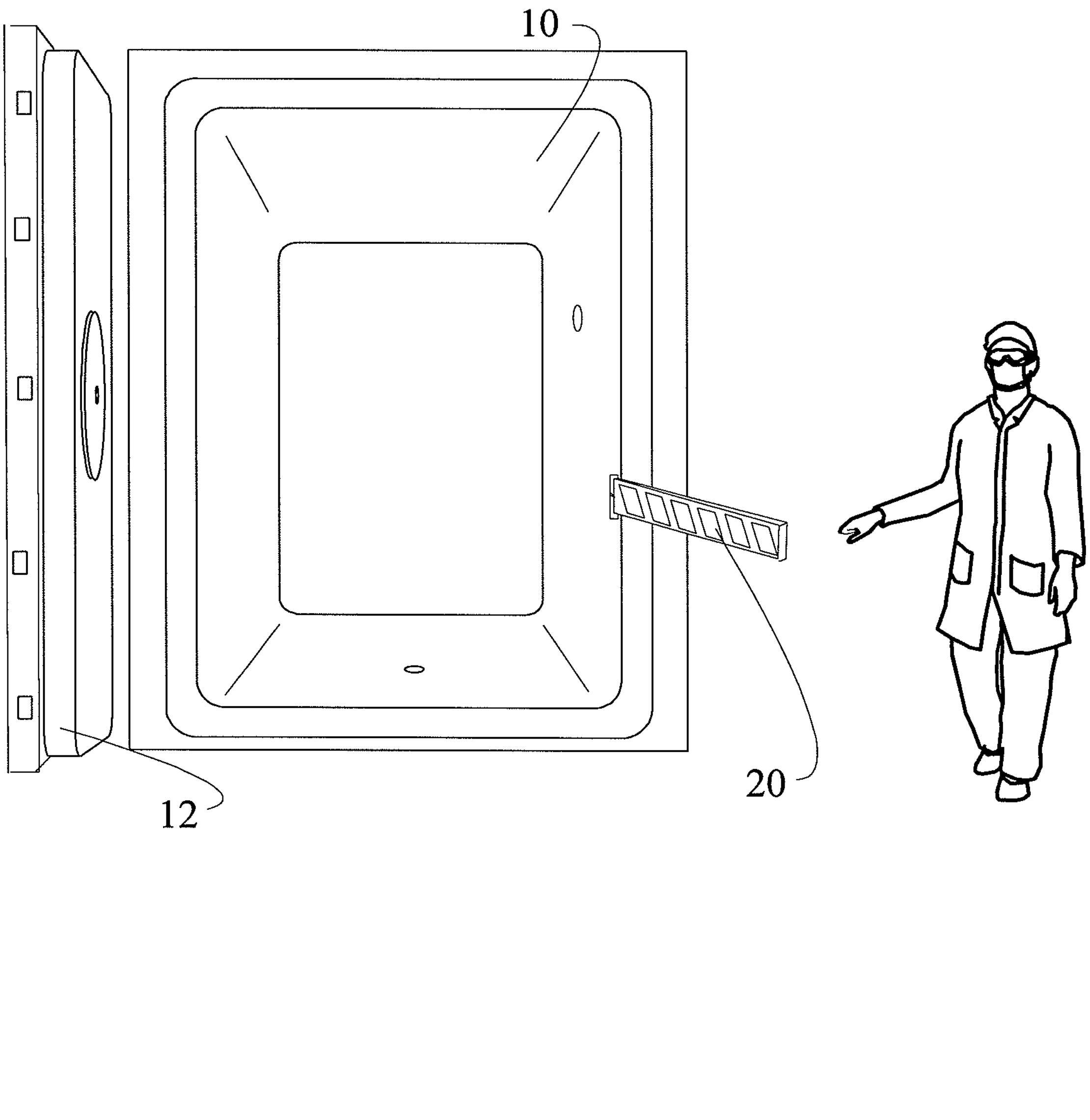

FIG. 3 shows the safety gate 20 in the safety position after the operator has swung the safety gate 20. FIG. 4 illustrates that safety gate 20 remains in the safety position after safety gate 20 has been opened and until safety gate 20 is purposely moved again by an operator.

Figure 5:
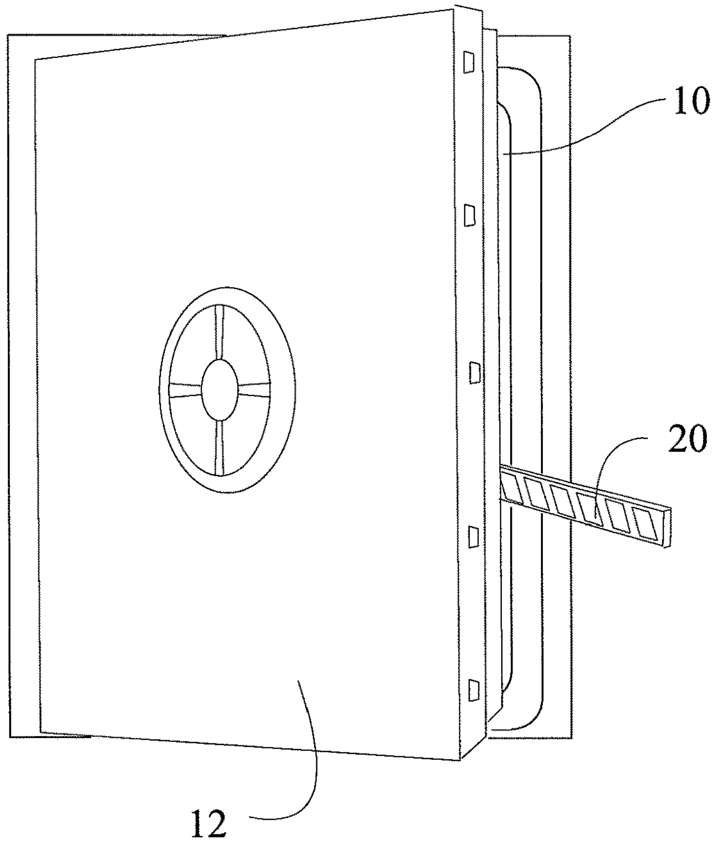
FIG. 5 is a front, perspective view of a sterilizing chamber with a safety gate in the safety position and illustrates how the safety gate prevents the chamber door from closing.

FIG. 5 illustrates how safety gate 20 blocks door 12 from fully shutting when safety gate 20 is in the safety position.

Figure 6:
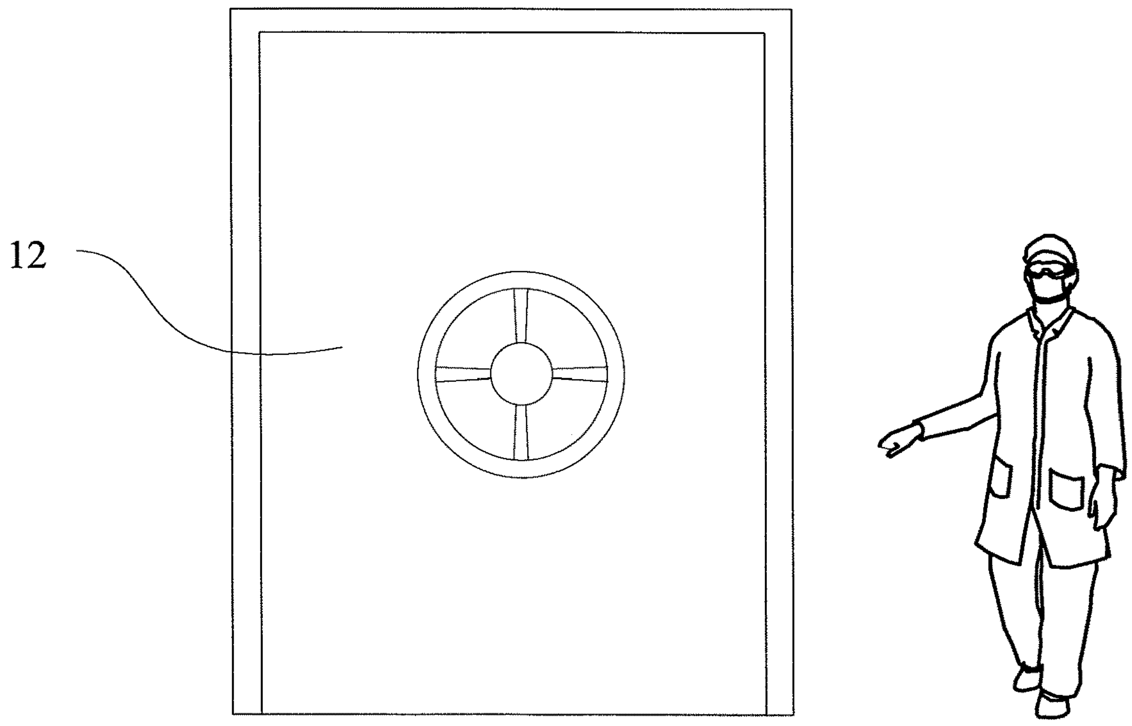
FIG. 6 is a front, perspective view of a sterilizing chamber with the chamber door closed.

FIG. 6 shows the door 12 closed after the safety gate 20 has been purposely returned to the closed position.

Figure 7:
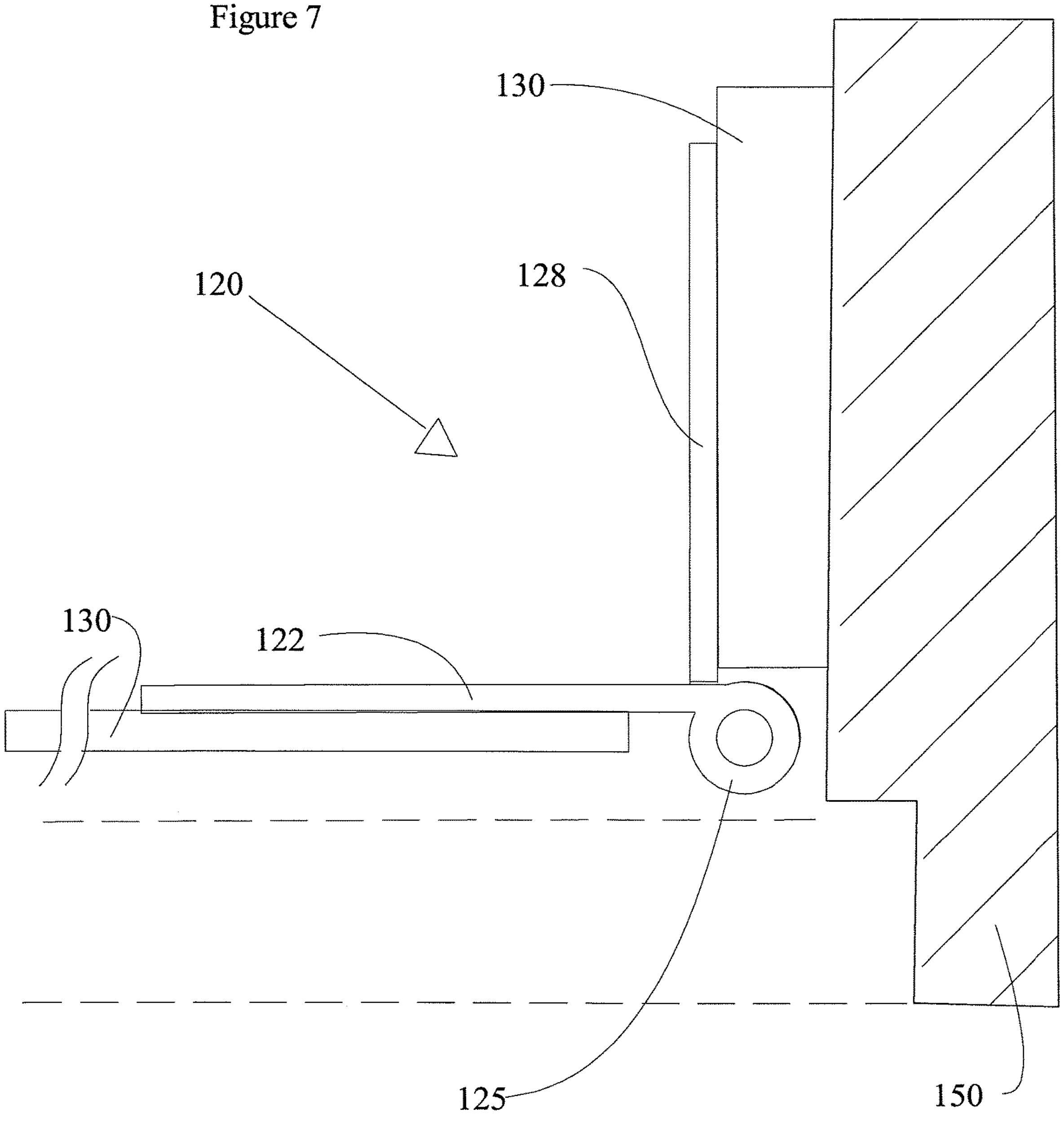
FIG. 7 is a top, plan view diagrammatically showing elements of a safety gate in the closed position illustrated in FIGS. 1 and 2.

FIG. 7 is a partial, top view, diagram of a safety gate 120 mounted on a mounting block 130 connected to the door jamb 150 and interior wall 152 of a confined space such as a sterilization chamber shown in FIG. 1. Safety gate 120 comprises a gate leaf 122, a hinge portion 125 and a jamb leaf 128. In this illustrated version, the jamb leaf 128 is the same size as the gate leaf 122. The gate leaf 122 can be dimensioned to span the full width of the access opening to the sterilization chamber. Alternatively, another section of gate can be attached to the gate leaf 122 in order to provide the desired length to the gate leaf 122 of the safety gate 120. Safety gate 120 can alternatively be mounted so that jamb leaf 128 is flush with the interior wall. The dashed lines in FIG. 7 represent the location of a door (not shown) to this confined space when the door is in the closed position. FIG. 7 shows the gate leaf 122 in the closed position where gate leaf 122 blocks ingress to the interior of a confined space. Gate leaf 122 can only swing outwardly from the illustrated closed position to the safety position. Gate leaf 122 cannot swing inwardly into the interior of the confined space and thus cannot be bypassed.

Figure 8:
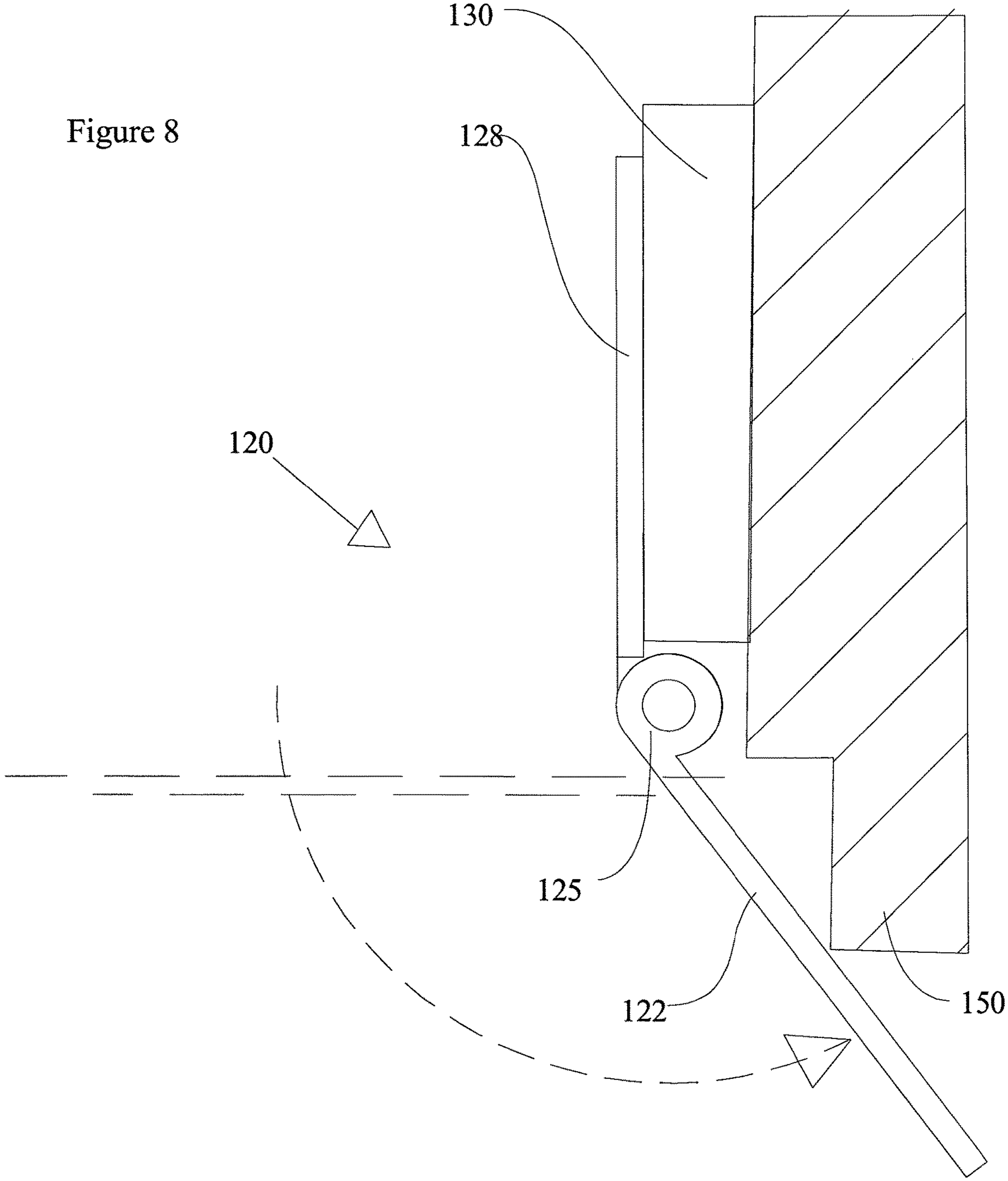
FIG. 8 is a top, plan view diagrammatically showing elements of a safety gate in the safety position illustrated in FIGS. 3 and 4.

FIG. 8 shows the safety gate 120 of FIG. 7 in the safety position.

Figure 9:
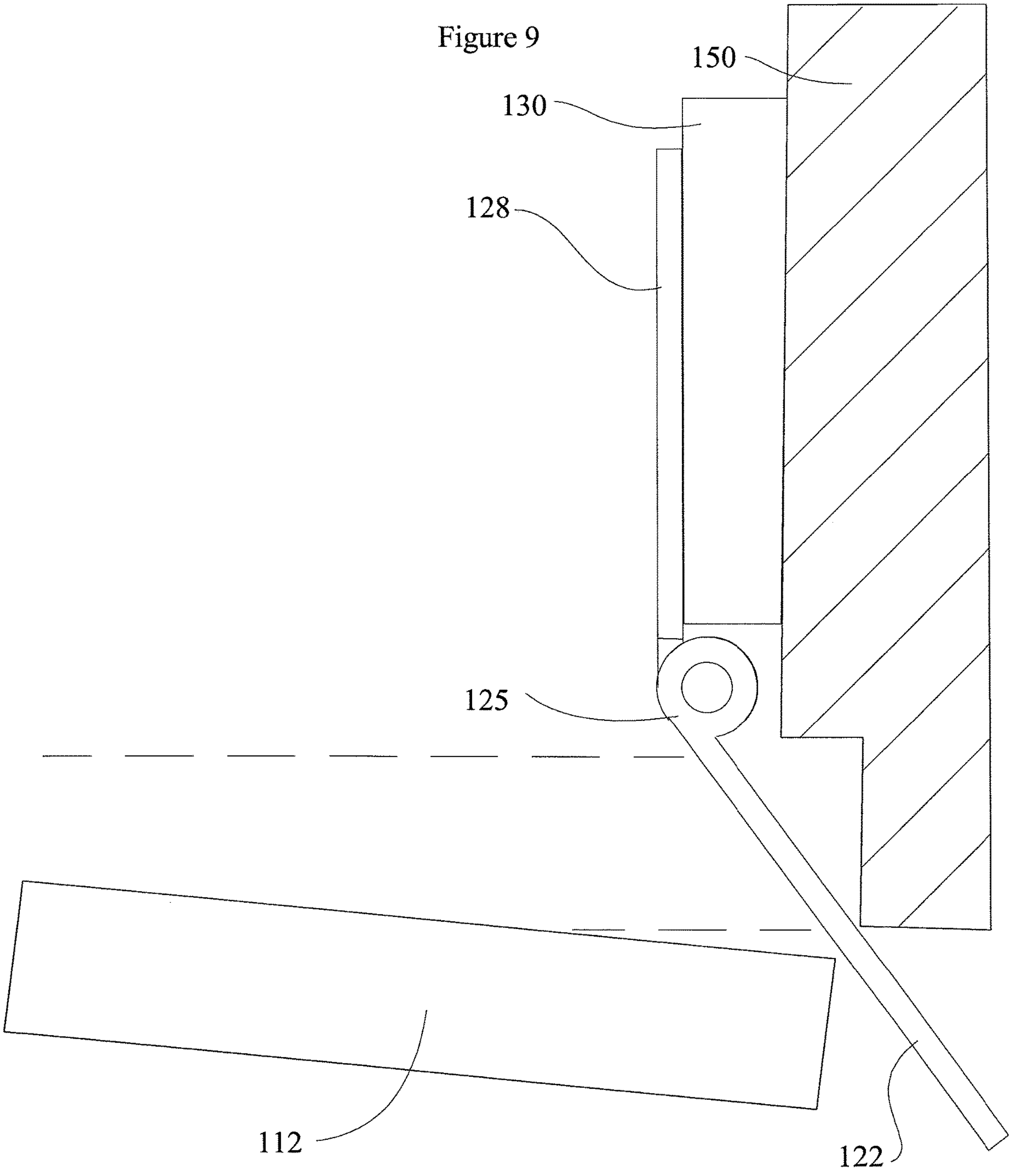
FIG. 9 is a top, plan view diagrammatically showing elements of a safety gate and chamber door with the safety gate preventing the door from closing as illustrated in FIG. 5.
Figure 10:
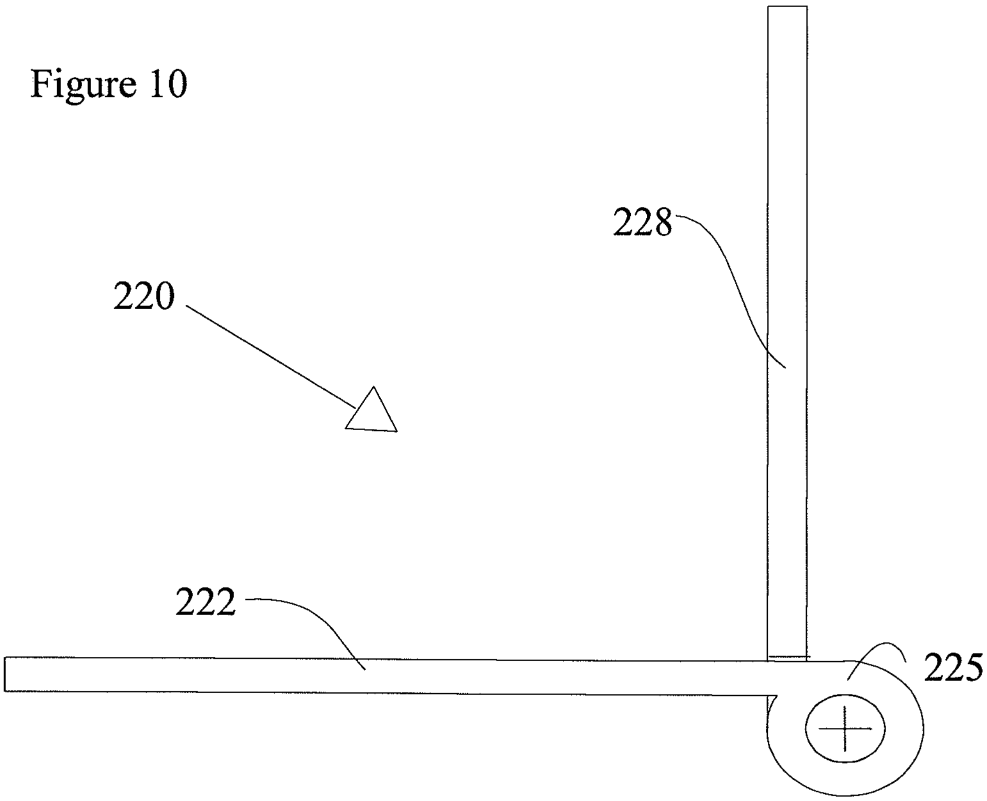
FIGS. 10 and 11 are top and front, perspective views, respectively, of a safety gate in the closed position.
Figure 11:
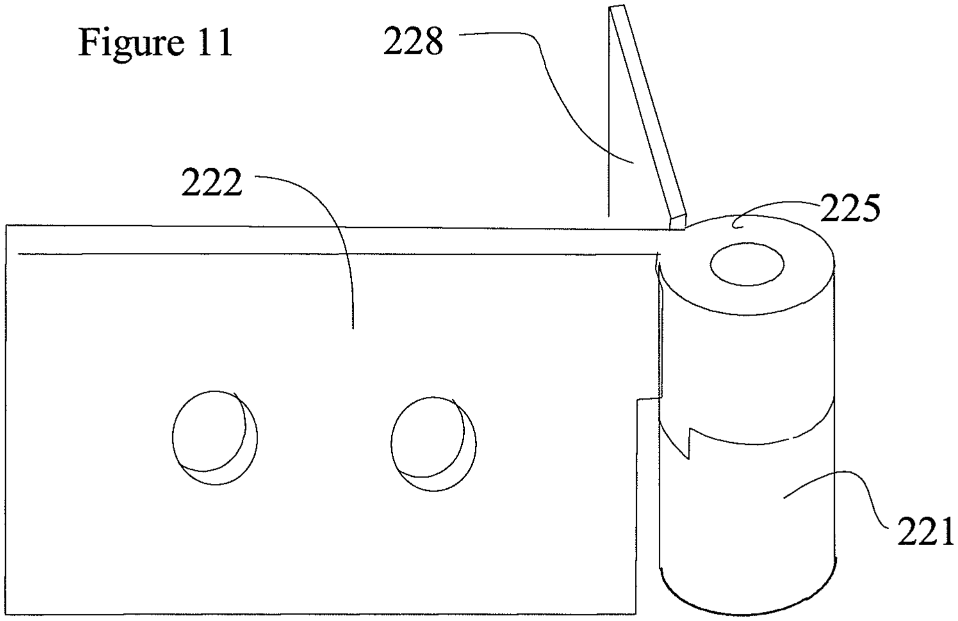
Figure 12:
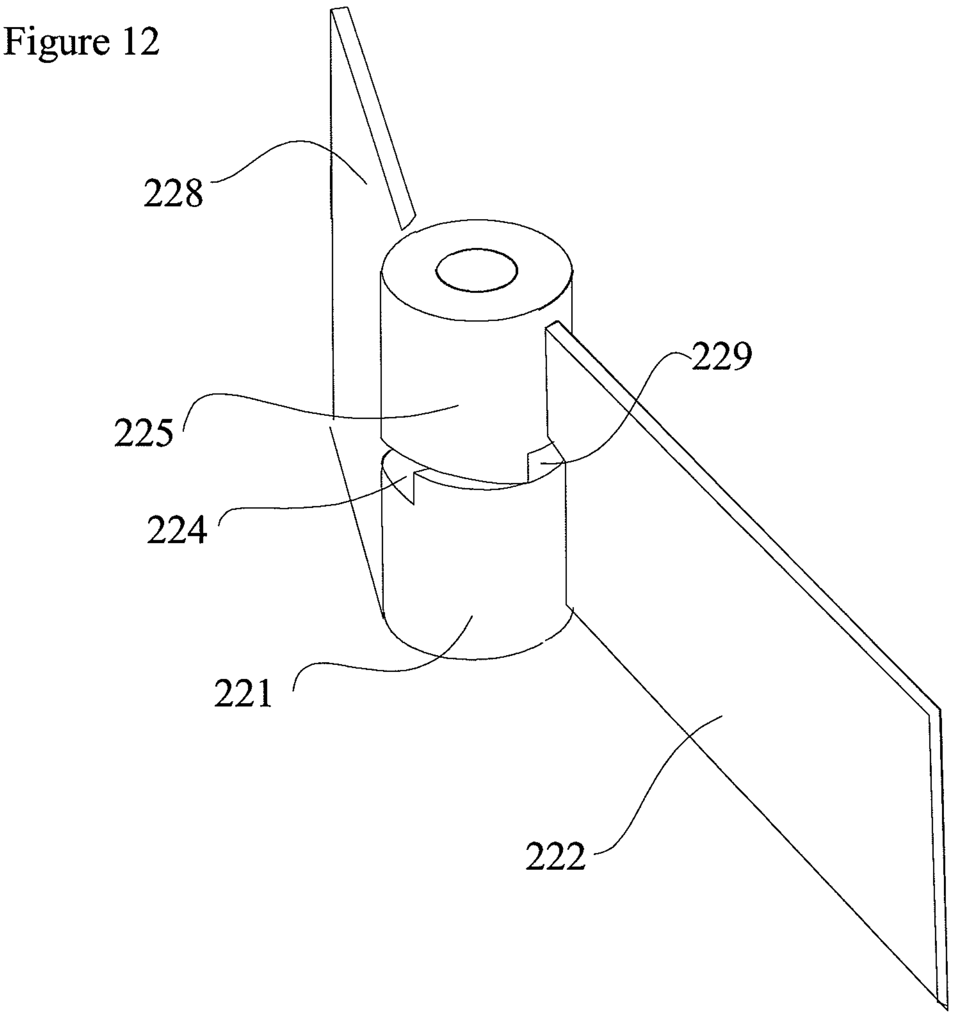
FIG. 12 is a front, perspective view of a safety gate in the safety position.

FIG. 9 shows the safety gate 120 of FIG. 7 in the safety position and blocking door 112 from fully closing.

FIGS. 10-13 illustrate an alternative safety gate 220 comprising a cam hinge 225. Cam hinge 225 has two hinge sections, a lower hinge section 221 with an upper inclined surface 223 and an upper hinge section 225 with a lower, inclined surface 226. Gate leaf 222 is connected to upper hinge section 225. The lower hinge section 221 and the upper hinge section 225 also comprise complementary stop surfaces 224, 228 respectively. The stop surfaces 224 and 229 normally maintain the gate leaf 222 in the closed position in the absence of purposeful force applied by an operator. In this illustrated embodiment, the gate leaf 222 must be raised sufficiently for the stop surface 229 of the upper hinge section 225 to clear the stop surface 224 of the lower hinge section 221 before the gate leaf 222 can be swung to the safety position shown in FIG. 12.

Figure 13:
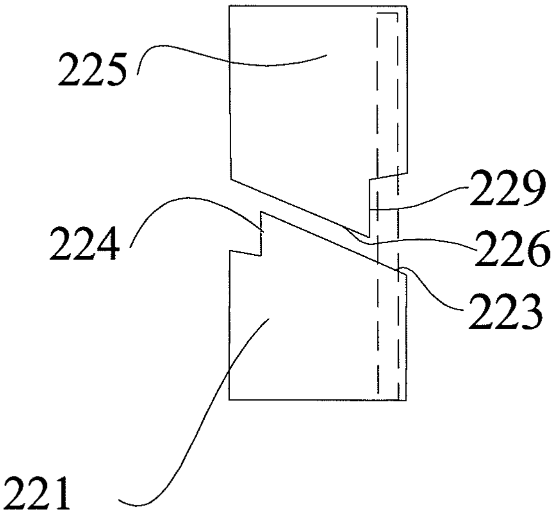
FIG. 13 is a close-up front view of the hinge of a safety gate in the safety position.
Figure 14:
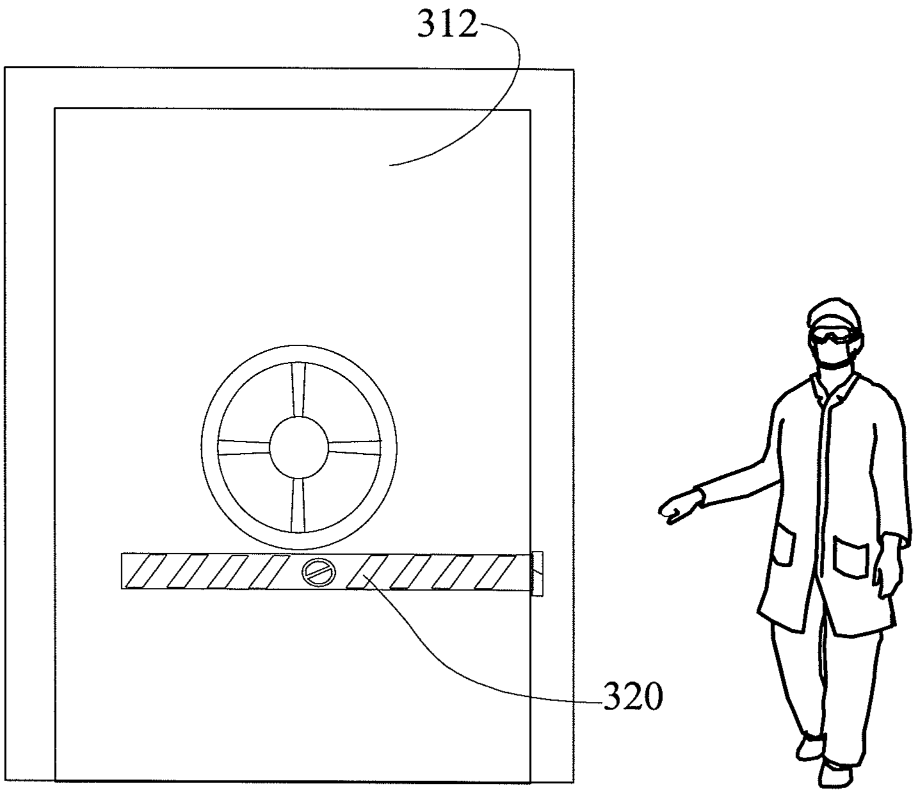
FIG. 14 is a front, perspective view of a sterilizing chamber with a safety gate mounted outside of the chamber and in the closed position.
Figure 15:
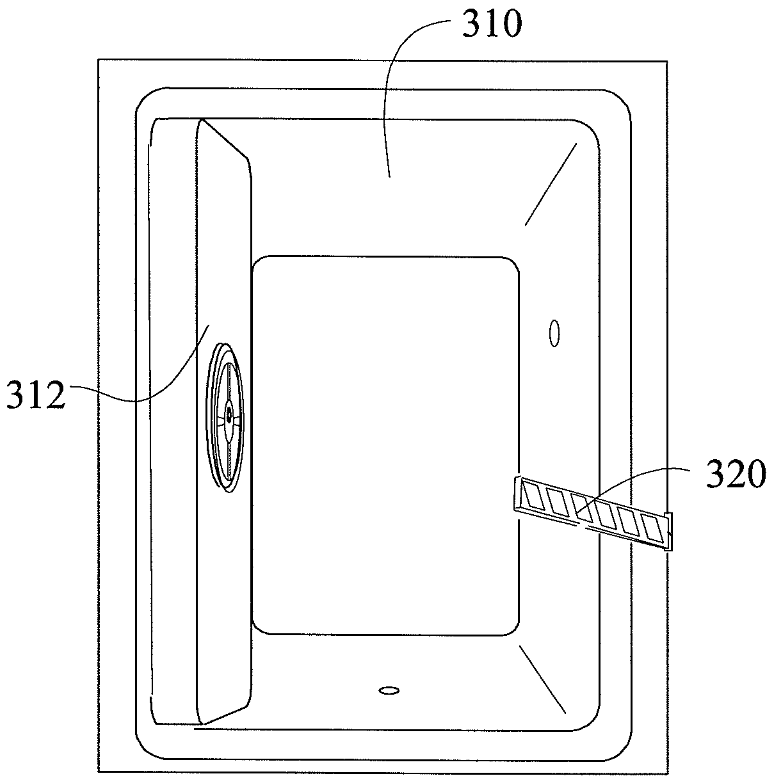
FIG. 15 is a front, perspective view of a sterilizing chamber with an inwardly opening door and a safety gate mounted outside of the chamber and in the safety position.
Figure 16:
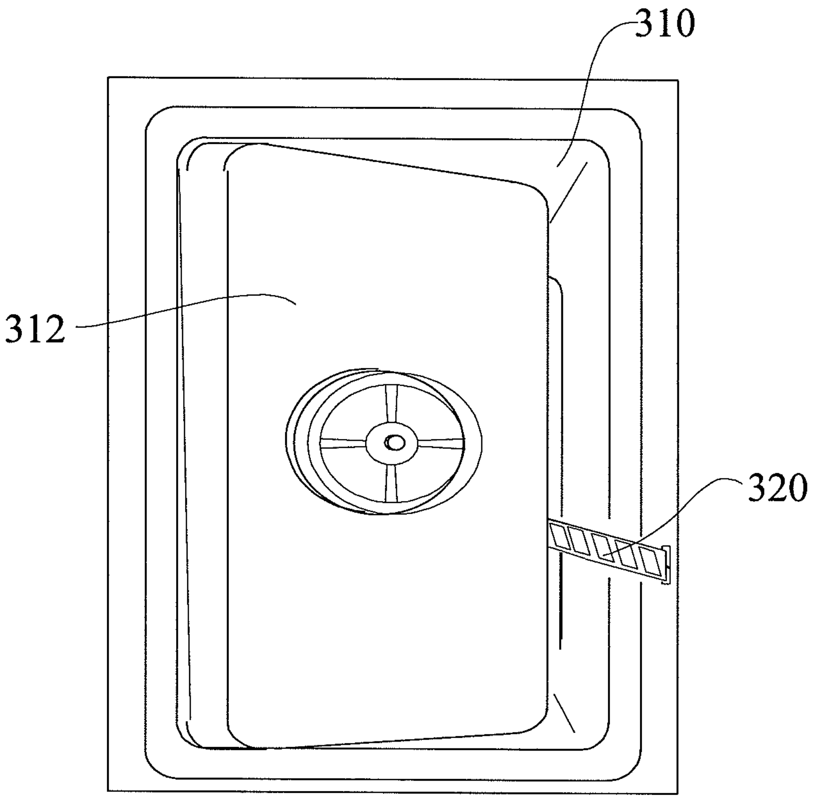
FIG. 16 is a front, perspective view of a sterilizing chamber with an inwardly opening door and a safety gate mounted outside of the chamber and in the safety position illustrating how the safety gate blocks the chamber door from closing.

The upper inclined surface 223 of lower hinge section 221 and lower inclined surface 226 of upper hinge section 225 are best shown in the side view of FIG. 13. When gate leaf 222 of safety gate 220 has been lifted and rotated so that upper stop 229 is clear of lower stop surface 224, the relative inclines of upper inclined surface 223 and lower, inclined surface 226, and the force of gravity acting on the upper hinge section 225 and gate leaf 222, bias gate leaf 222 to the safety position FIGS. 14-16 illustrate a safety gate 320 designed for use with an inwardly opening door 312. As shown in FIG. 14, safety gate 320 is mounted on an outer wall, outside of door 312. In this embodiment, an operator might open door 312 and safety gate 320 simultaneously. FIG. 15 shows safety gate 320 in the safety position where safety gate 320 blocks the door 312 from shutting fully as illustrated in FIG. 16.

Figure 17:
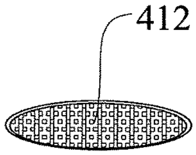
FIG. 17 is a perspective view of a manhole cover in the closed position.
Figure 18:
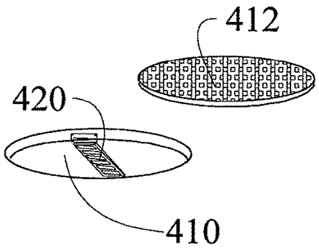
FIG. 18 is a perspective view of a manhole cover in the open position with a safety gate in the closed position.
Figure 19:
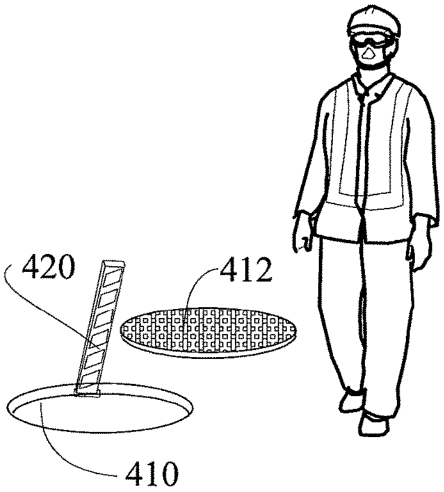
FIG. 19 is a perspective view of a manhole cover in the open position with a safety gate in the safety position.

FIGS. 17-19 illustrate as safety gate 420 used for horizontal access openings, such as the illustrated manhole cover 412. FIG. 17 shows the manhole cover 412 in its normal position closing the manhole. FIG. 18 shows the manhole cover 412 removed, but access to the manhole 410 is blocked by safety gate 420. Before a worker can gain access to the manhole, the worker must raise safety gate 420 to the safety position shown in FIG. 19. Safety gate 420 is biased to remain in the fully closed position shown in FIG.

18 when the safety gate 420 is closed and to remain in the safety position shown in FIG. 19 after the safety gate 40 has been moved to the safety position. This biasing force can be provided by a spring, and or by gravity on the downward slope of the hinge.

All of the disclosed safety gates are also preferably provided with signage, markings, coloration or other indicators as desired.

The hinge and/or safety gates of other embodiments have built-in switches. The hinge or safety gate positions are used to change the state of a switch. For example, the hinge or safety gate changes the state of a photo switch or other presence detecting devices (e.g. PIR, Lidar, Radar, etc.), that are located outside of the entrance (doorway), thus signaling the controls for the activity in the confined space.

Alternatively, a switch can be opened or closed by physical contact of the safety gate with a switch.

Another embodiment comprises operating equipment comprising a structure defining a confined space large enough to contain a human adult and comprising at least a first access opening which is large enough for human ingress into and egress from said confined space; a supply of at least one condition to the confined space for performing an operation, wherein said at least one condition would present an imminent danger to the survivability of a human adult present within said confined space during said operation; a selectively openable and closable access barrier which is selectively movable from a closed position to an open position, said access barrier openable to an open position which permits an adult human ingress to and egress from said confined space through said first access opening and closable to a closed position which does not permit ingress and egress through said first access opening; and a safety gate movable from a closed position, wherein the gate extends across said first access opening and obstructs the ingress of an adult human into said confined space through said first access opening, to a safety position which does not permit said access barrier to be positioned in said closed position. In this version the operating equipment may create a condition comprising at least one of an extreme temperature, a vacuum, high pressure, steam and or a toxic chemical.

In another version, the operating equipment is one of an autoclave, a sterilizer, and wash equipment.

The invention claimed is:

1. A safety system comprising an entrapment preventer in the form of a movable safety gate, the safety system comprising:
 - a confined space comprising at least a first access opening comprising a width and a selectively openable and closable access barrier which is selectively movable from a closed position to an open position, said access barrier openable to said open position which permits ingress to and egress from said confined space through said first access opening and closable to said closed position which does not permit ingress and egress through said first access opening;
 - a safety gate movable from a closed position, wherein the gate extends across said first access opening and obstructs the ingress into said confined space through said first access opening, to a safety position which does not permit said access barrier to be positioned in said closed position;
 - said access barrier movable independent of said safety gate such that movement of said access barrier does not cause movement of said safety gate.

2. A safety system according to claim 1 wherein said safety gate is biased toward said safety position.

3. A safety system according to claim 1 wherein said safety gate remains in said closed position in the absence of outside forces but when said safety gate is moved from said closed position, said safety gate automatically moves to said safety position.

4. A safety system according to claim 3 wherein said confined space is selected from the group consisting of autoclaves, bulk sterilizers, washers, vaults, freezers, machines, pens, and cold storage rooms.

5. Operating equipment comprising:
 - a structure defining a confined space and comprising at least a first access opening comprising a width for ingress into and egress from said confined space;
 - a source for supplying at least one operating condition to the confined space for performing an operation, wherein said at least one condition would present an imminent danger to the survivability of a human adult present within said confined space during said operation;
 - a selectively openable and closable access barrier which is selectively movable from a closed position to an open position, said access barrier openable to an open position which permits ingress to and egress from said confined space through said first access opening and closable to a closed position which does not permit ingress and egress through said first access opening;
 - a safety gate movable from a closed position, wherein the gate extends across a substantial portion of the width of said first access opening and obstructs the ingress of an adult human into said confined space through said first access opening, to a safety position which does not permit said access barrier to be positioned in said closed position.

6. Operating equipment according to claim 5 wherein said condition comprises at least one of an extreme temperature, a vacuum, high pressure, steam and/or a toxic chemical.

7. Operating equipment according to claim 6 wherein said operating equipment is one of an autoclave, a chemical sterilizer, and wash equipment.

8. Operating equipment according to claim 5 wherein said operating equipment is one of an autoclave, a chemical sterilizer, and washing equipment.

9. Operating equipment according to claim 5 wherein said access barrier is a door.

10. A safety system according to claim 1 wherein said access barrier is a door.

11. A safety system comprising an entrapment preventer in the form of a movable safety gate, the safety system comprising:
 - a confined space comprising at least a first access opening comprising a width and a selectively openable and closable access barrier which is selectively movable from a closed position to an open position, said access barrier openable to said open position which permits ingress to and egress from said confined space through said first access opening and closable to said closed position which does not permit ingress and egress through said first access opening;
 - a safety gate movable from a closed position, wherein the gate extends across a substantial portion of the width of said first access opening said first access opening and obstructs the ingress into said confined space through said first access opening, to a safety position which does not permit said access barrier to be positioned in said closed position;

said access barrier movable independent of said safety gate such that movement of said access barrier does not cause movement of said safety gate.

12. A safety system according to claim 11 wherein said access barrier is a door.

13. A safety system according to claim 11 wherein said safety gate is biased toward said safety position.

14. A safety system according to claim 11 wherein said safety gate remains in said closed position in the absence of outside forces but when said safety gate is moved from said closed position, said safety gate automatically moves to said safety position.

15. A safety system according to claim 11 wherein said confined space is selected from the group consisting of autoclaves, bulk sterilizers, washers, vaults, freezers, machines, pens, and cold storage rooms.

* * * * *